US009671232B2

(12) United States Patent
Nandan

(10) Patent No.: US 9,671,232 B2
(45) Date of Patent: Jun. 6, 2017

(54) GRID-BASED ARRIVAL TIME PREDICTION

(71) Applicant: Naveen Nandan, Singapore (SG)

(72) Inventor: Naveen Nandan, Singapore (SG)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 14/277,015

(22) Filed: May 13, 2014

(65) Prior Publication Data
US 2015/0330798 A1 Nov. 19, 2015

(51) Int. Cl.
*G01C 21/26* (2006.01)

(52) U.S. Cl.
CPC .................................. *G01C 21/26* (2013.01)

(58) Field of Classification Search
CPC ............. G08G 1/0104; G06F 2217/16; G06F 17/30241
USPC ................................................. 701/409, 400
See application file for complete search history.

(56) References Cited

U.S. PATENT DOCUMENTS

| 8,301,370 | B2 * | 10/2012 | Van Diggelen | G01S 19/50 342/357.25 |
| 2005/0206534 | A1 * | 9/2005 | Yamane et al. | 340/994 |

OTHER PUBLICATIONS

Gustavo Petro, "A developed country is not a place where the poor have cars. It's where the rich use public transportation" http://www.changemakrs.com/GustavoPetro, Changemarks.

Pengfei Zhou et al., "How Long to Wait?: Predicting Bus Arrival Time with Mobile Phone based Participatory Sensing", MobiSys'12, Jun. 2012, ACM, UK.

Bin Yu et al., "Bus Travel-Time Prediction with a Forgetting Factor", Journal of Computing in Civil Engineering, Nov. 2012, ASCE.

Wenjing Pu et al., "Real-Time Estimation of Urban Street Segment Travel Time Using Buses as Speed Probes" Journal of the Transportation Research Record No. 2129, 2009, pp. 81-89, Transportation Research Board of the National Academies, Washington.

Le Minh Kieu et al., "Bus and Car Travel Time on Urban Networks: Integrating Bluetooth and Bus Vehicle Identification Data", 2012, 25th ARRB Conference—Shaping the Future: Linking Policy, Research and Outcomes, ARRB Group Ltd and Authors, Australia.

Arvind Arasu et al., "STREAM: The Stanford Data Stream Management System", Technical Report, 2004 Department of Computer Science, Stanford University.

Sirish Chandrasekaran et al., "TelegraphCQ: Continuous Dataflow Processing for an Uncertain World", 2003, Proceedings of the 2003 CIDR Conference, Very Large Data Base Endowment.

(Continued)

*Primary Examiner* — Nga X Nguyen
(74) *Attorney, Agent, or Firm* — Horizon IP Pte. Ltd.

(57) ABSTRACT

Described herein is a framework for predicting arrival time of moving objects based on grid modeling of location data. In accordance with one aspect of the framework, location data of a moving object is received and positions of the moving object may be identified based on a grid model by mapping the location data to the grid model. The grid model may be segmented into cells where a cell transition time of the moving object from a current cell to another cell may be determined. The arrival time of the moving object may then be predicted based on the cell transition time of the moving object. The arrival time of the moving object may further be presented to one or more user devices.

20 Claims, 6 Drawing Sheets

(56) References Cited

OTHER PUBLICATIONS

Mitch Cherniack et al., "Scalable Distributed Stream Processing", 2003, Proceedings of the 2003 CIDR Conference, Very Large Data Base Endowment.
Jianjun Chen et al., "NiagaraCQ: A Scalable Continuous Query System for Internet Databases", May 2000, Computer Sciences Department, University of Wisconsin-Madison.
Yunyue Zhu et al., "StatStream: Statistical Monitoring of Thousands of Data Streams in Real Time", 2002, Proceedings of the 28th VLDB Conference, Hong Kong, China.
Wei Fan, "StreamMiner: A Classifier Ensemble-based Engine to Mine Concept-drifting Data Streams", 2004, Proceedings of the 30th VLDB Conference, Toronto, Canada.
Chuck Cranor et al., "Gigascope: A Stream Database for Network Applications", SIGMOD, Jun. 2003, ACM, San Diego, CA.

\* cited by examiner

400a

400b

400c

GRID-BASED ARRIVAL TIME PREDICTION

TECHNICAL FIELD

The present disclosure relates to computer systems, and more specifically, to a framework for predicting arrival time of moving objects based on grid modeling of location data.

BACKGROUND

Transportation is an important aspect of a city's operations. As majority of the population in cities rely on public transportation, public transportation operators and city planners typically invest their resources and time to improve public transportation systems and services. For example, public transportation operators provide schedule of their services for commuters on the web, through mobile apps or display boards at stations to improve the use of the public transportation and facilitate commuters in planning their traveling time. However, unforeseen circumstances such as delays due to heavy traffic or accidents may cause a vehicle to deviate from its scheduled timetable, resulting the schedule to be inaccurate and unreliable. Long waiting time tends to cause bad experience for commuters as they are unaware of the current location of the vehicles and are unable to manage their time effectively. Furthermore, the unavailability or inaccuracy of systems that predict the estimated arrival time of vehicles or its schedule remains an important concern that needs to be addressed.

From the foregoing discussion, it is desirable to provide an accurate and reliable prediction of arrival time of transportation vehicles.

SUMMARY

A framework for facilitating grid-based prediction of arrival time is described herein. In accordance with one aspect of the framework, location data of a moving object is received and positions of the moving object may be identified based on a grid model by mapping the location data to the grid model. The grid model may be segmented into cells where a cell transition time of the moving object from a current cell to another cell may be determined. The arrival time of the moving object may be predicted based on the cell transition time of the moving object. The predicted arrival time of the moving object may further be presented to one or more user devices.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein.

DETAILED DESCRIPTION

Figure 1:
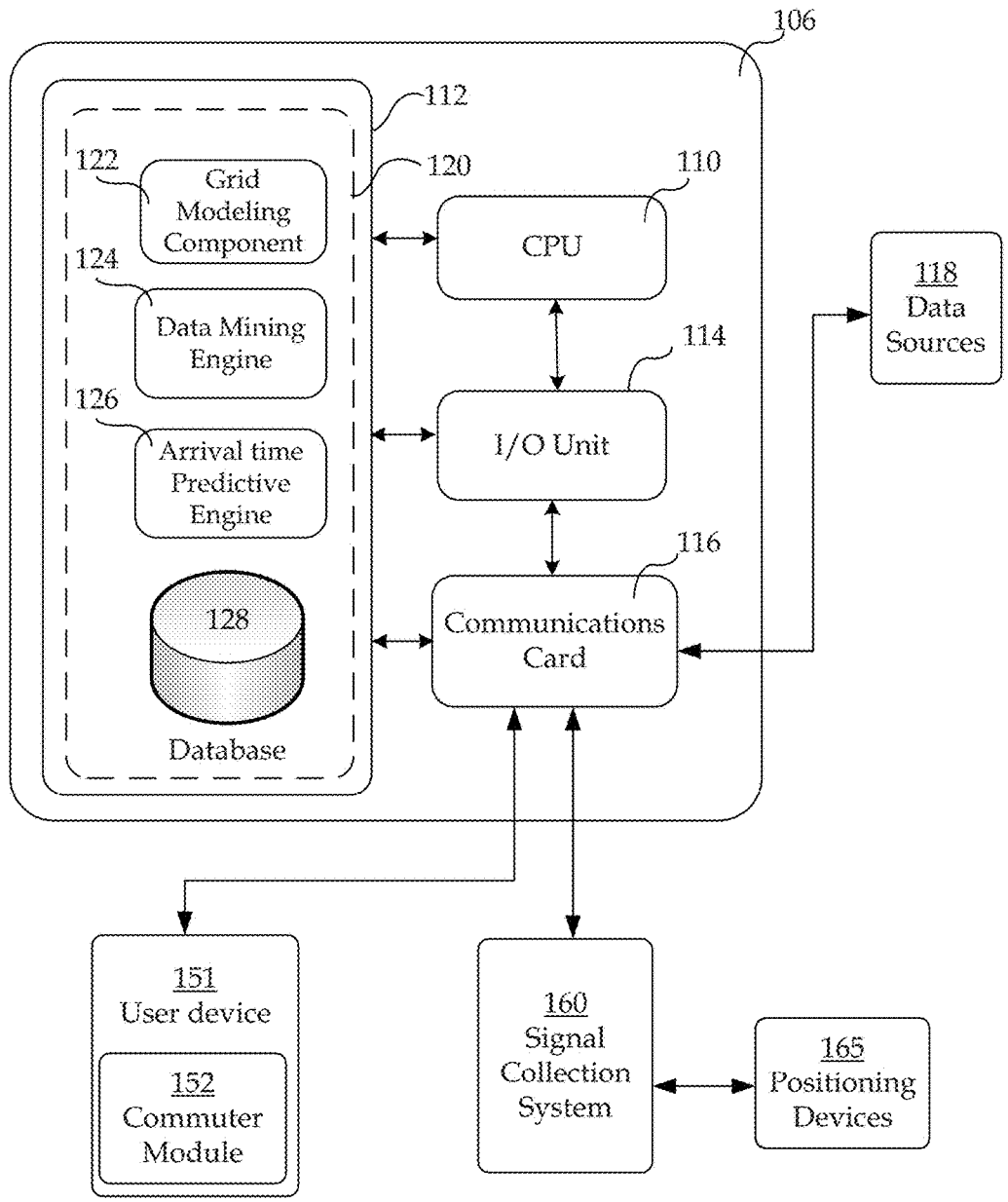
FIG. 1 shows a block diagram of an exemplary environment.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for predicting arrival time of moving objects is described herein. In accordance with one aspect, the present framework dynamically predicts and estimates arrival time of moving objects based on a grid model. The grid, for instance, may be modeled according to a particular geographical region. The grid is segmented into grid cells. In some implementations, the framework may predict the arrival time of a moving object by determining the cell transition time of the moving object from one cell to an adjacent cell and the average cell transition time of all moving objects between those two cells. The average cell transition time, for example, may be determined for all moving objects transitioning between the cells. Accordingly, the estimated arrival time of the moving object may be determined with high accuracy as it may be based on the traffic condition of a particular geographical area. The estimated arrival time, for example, may be determined for the object to arrive at a point B from a point A. In other cases, the arrival time may be estimated, for example, for the object to arrive at its destination from its current location.

In one implementation, the framework may continuously calculate the estimated arrival time of the moving object each time it transitions from one cell to another. In cases where the cells are finely segmented and the transition is quick, the arrival times are effectively estimated in real time. In such cases, the estimated arrival time of each moving object may be dynamically updated to provide an accurate estimated arrival time. In some implementations, the positions of the moving object within the grid may be determined based on the location data of the moving object. Such location data may be continuously collected using, for example, a navigation system such as a global positioning system (GPS) or Global Navigation Satellite System (GLONASS). The location data may be effectively collected in real time. For instance, the framework may employ GPS devices installed on-board vehicles to continuously collect and process vehicle location data so as to predict the estimated arrival time of the vehicles.

The framework may communicate the estimated arrival time of a moving object to one or more recipients in response to receiving a request for such information. For example, commuters may request for information such as the arrival time of buses or taxis. This advantageously provides more convenience to commuters and enhances the quality of transportation services. In some cases, public transportation service providers may provide commuters with accurate and up-to-date estimated arrival time of public vehicles, for example, via a dashboard at public transportation stations and web browsers of a computing device. Such features, among other things, promote the use public transportation as commuters have better control in managing waiting times. In other implementations, the framework may communicate the estimated arrival time of a driver of a personal vehicle to his or her friends and/or family members.

As will be discussed herein, moving objects, for example, may refer to transportation vehicles (including buses, cars, trucks, vans, trains, airplanes or ships), or people equipped with handheld positioning devices. It should be appreciated that the framework described herein may be implemented as a method, a computer-controlled apparatus, a computer process, a computing system, or as an article of manufacture such as a computer-usable medium. These and various other features will be apparent from the following description.

FIG. 1 shows a block diagram of an exemplary environment 100. The environment 100, for example, facilitates predictive analysis of collected location data of moving objects to estimate its arrival time. In one embodiment, the environment includes a computer system 106, one or more data sources 118, one or more user devices 151 and a signal collection system 160. For purpose of illustration, predicting arrival time of moving objects may be described in the context of vehicles. The vehicles, for example, may be buses, trains, or taxis. It should be appreciated that the framework described herein may also be applied to other types of vehicles or moving objects.

Computer system 106 may be any type of computing device capable of responding to and executing instructions in a defined manner, such as a workstation, a server, a portable laptop computer, another portable device, a mini-computer, a mainframe computer, a storage system, a dedicated digital appliance, a device, a component, other equipment, or some combination of these. Computer system 106 may include a central processing unit (CPU) 110, an input/output (I/O) unit 114, a memory module 112 and a communications card or device 116 (e.g., modem and/or network adapter) for exchanging data with a network (e.g., local area network (LAN), wide area network (WAN), Internet, etc.). It should be appreciated that the different components and sub-components of the computer system 106 may be located or executed on different machines or systems. For example, a component may be executed on many computer systems connected via the network at the same time (i.e., cloud computing).

Computer system 106 may further be communicatively coupled to one or more data sources 118. A data source 118 may be, for example, any database (e.g., relational database, in-memory database, etc.), a repository, an entity (e.g., set of related records), or a data set included in a database, website or third-party system. In some implementations, data sources 118 include a transportation operator's system (e.g., public bus provider system) which may include, for example, schedule of transportation services.

Computer system 106 may act as a server and operate in a networked environment using logical connections to the user devices 151 and the signal collection system 160. The user devices 151 can receive, transmit, process and store any appropriate data associated with the environment 100. Each user device 151 may be associated with one or more particular users (e.g., commuters), and serve as an interface to receive requests for transportation vehicle information such as the arrival time. In some implementations, the user devices 151 may include, for example, mobile devices (e.g., smart phone, tablet computer, laptop communication device), desktop computers with web browsers and/or panels of public transportation stations or stops (e.g., bus stop panels) that present vehicles' arrival times. In the case where the user device is a commuter mobile device, it may be handheld or carried by a commuter, whereas for a bus stop panel, it may be physically installed at a bus stop. The user devices 151 may include components similar to a computer system, such as an input device for receiving and processing user input (e.g., touch screen, keypad, freeform text recognition module, speech recognition module, etc.), an output device for displaying a user interface or dashboard, a communications card, memory for storing a software application or commuter module 152, a processor for executing the commuter module 152, and so forth.

In some implementations, the commuter module 152 communicates with the computer system 106 to send requests for vehicle information such as the vehicle estimated arrival time, and to receive updates of the estimated arrival time. For example, the commuter module 152 may send requests for the estimated arrival time of a public bus. Commuter module 152 may present a user interface or dashboard to display the vehicle arrival information provided by the computer system 106. For example, the commuter module 152 may be a mobile app of a mobile commuter device that presents an interface for a commuter to request for an estimated arrival time of a particular bus. In some instances, the commuter module 152 may be a dashboard at a bus stop panel that displays the estimated arrival time of buses that service that particular bus stop.

The signal collection system 160, for example, is arranged to collect location data of vehicles. For example, the signal collection system 160 may be communicatively connected to one or more positioning devices 165 to collect substantially real-time bus location data and stream the collected data to the central computer system 106. The collected data, for instance, may be streamed at regular time intervals. For example, the collected location data may be streamed at 60 times or more per minute. The signal collection system 160, for example, may be a satellite-based system such as a GPS tracking system. Providing other types of location data collection systems may also be useful. The positioning devices 165, for instance, may be installed on-board transportation vehicles or, in some cases, may be handheld mobile devices that collect location data of objects as it moves from one location to another. Examples of positioning devices 165 may include GPS devices. Other types of positioning devices may also be useful. It should be appreciated that the positioning devices may also be implemented in user devices 151 such as a commuter mobile device.

In some implementations, the signal collection system 160 may collect location data of a plurality of vehicles. Different vehicles may be differentiated by, for example, the vehicle identifier (ID). Furthermore, the signal collection system 120 may collect location data for a plurality of vehicles of a plurality of types of vehicles. For example, the system may collect location data of different types of vehicles. Different vehicles may be differentiated by their respective vehicle ID as well as movement pattern and speed. Other techniques for differentiating different types of objects may also be useful.

To facilitate collecting location data of different types of vehicles, the signal collection system 160 may include different collection systems. In some implementations, the systems may be sub-systems of an overall system. Other configurations of systems or sub-systems may also be useful. In one implementation, the signal collection system 160 may be configured to collect location data of multiple types of vehicles. For example, the collection system 160 may serve as a centralize collection system. Providing a signal collection system 160 adapted to collect location data of a type of vehicle may also be useful. For example, different transportation service providers (e.g., public bus operators, taxi providers, etc.) may employ separate signal collection systems 160. Other configurations of the signal collection system 160 may also be useful.

The collected location data, in one embodiment, may be a data stream of location data. The location data may be continuously input into the computer system 106 as it is collected by the signal collection system 160. Providing a data file containing location data may also be useful. The location data may include, for example, 2-D or 3-D spatial-temporal data. For example, the location data may include space and time information. Spatial information may be 2-dimensional (2D) spatial information. For example, the spatial information, may include geographic coordinates such as longitude and latitude coordinates of the vehicles.

In other cases, the spatial information alternatively may be 3-dimensional (3D) spatial information. For example, spatial information may include longitude, latitude and altitude information. 3D spatial information is particularly useful for tracking or monitoring movements of, for example, airplanes. Other configurations of spatial information may also be useful. The spatial information, along with the temporal information, such as a time stamp, can track the movement or position of an object. An object ID may be included in the location data to identify the object with which the location data is associated. For example, each object will have a unique ID. This enables location data of multiple objects to be appropriately processed in the environment 100. Other types of information may also be included in the location data.

Referring back to FIG. 1, memory module 112 of the computer system 106 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by CPU 110. As such, the computer system 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 of the computer system 106 includes a predictive analytics unit 120 for implementing the techniques described herein. The predictive analytics unit 120 may include, but is not limited to, a grid modeling component 122, a data mining engine 124, an arrival time predictive engine 126, a database 128 and so forth. It should be appreciated that some or all of these exemplary components may also be implemented in another computer system (e.g., user device 151).

The grid modeling component 122 may include a set of function modules or programs configured to provide a grid model of a particular geographical region, and identify the positions and/or transitions of vehicles along a route based on the grid model. The data mining engine 124 may include a set of function modules or programs configured to search for vehicle information such as the scheduled arrival time of vehicles from one or more data sources. The arrival time predictive engine 126 may include a set of function modules or programs configured to calculate an estimated arrival time of vehicles based on the grid model and may further send the estimated arrival time of the vehicles to one or more user devices 151.

The database 128 may serve to store collected location data and any other associated data of the vehicles. For example, the location data may include vehicle identifier (ID), geographical coordinates such as longitude and latitude coordinates of the vehicle (e.g., bus), time stamp of the collected coordinates. The location data may be stored for future retrieval and analysis. In some cases, the stored data may be used as historical location data of vehicles. It should be appreciated that such location data may also be stored in an external database such as a data repository 118.

In some implementations, the computer system 106 may also include a preprocessor (not shown) that separates the location data when the data is received. For example, the location data may be separated by moving objects based on object IDs. Various techniques may be employed for separating the location data. For example, filtering by object ID may be used. Other techniques may also be employed. The location data, for example, may be queried from a data table by objects or object IDs. The location data may be contained in a data table. For example, as the location data is streamed into the system 106, the data is organized into a data table.

In one implementation, the computer system 106 processes on-line location data. For example, processing data on-line involves analyzing data stream as the object is moving. This enables real time tracking of the object or objects. In other implementations, the computer system 106 processes off-line location data. For example, location data captured over time may be stored as a data file and provided to the computer system 106. The data file, for example, may be a data table containing historic location data. The preprocessor may separate the location data into separate location data based on objects. For example, the location data may be separated into l location data tables corresponding to l objects. The computer system 106 may process multiple location data table at a time based on the l objects. In some cases, the preprocessor may separate the location data into separate location data based on objects and object types. For example, the location data may be separated into lp location data tables corresponding to l objects and p object types. The computer system 106 may process multiple location data table at a time based on the l objects and p object types. In some implementations, the location data table may be treated as a data stream and is processed as if it were on-line data. Other configurations of processing off-line location data may also be useful.

In some implementation, the computer system 106 processes a combination of off-line and on-line data. For example, off-line data may be provided as a data file or table which includes historical collected data. Off-line data may be collected when the computer system 106 is not initiated. After the off-line data is processed, on-line data is processed. The process which includes processing off-line and on-line data may be considered as on-line processing.

Figure 2:
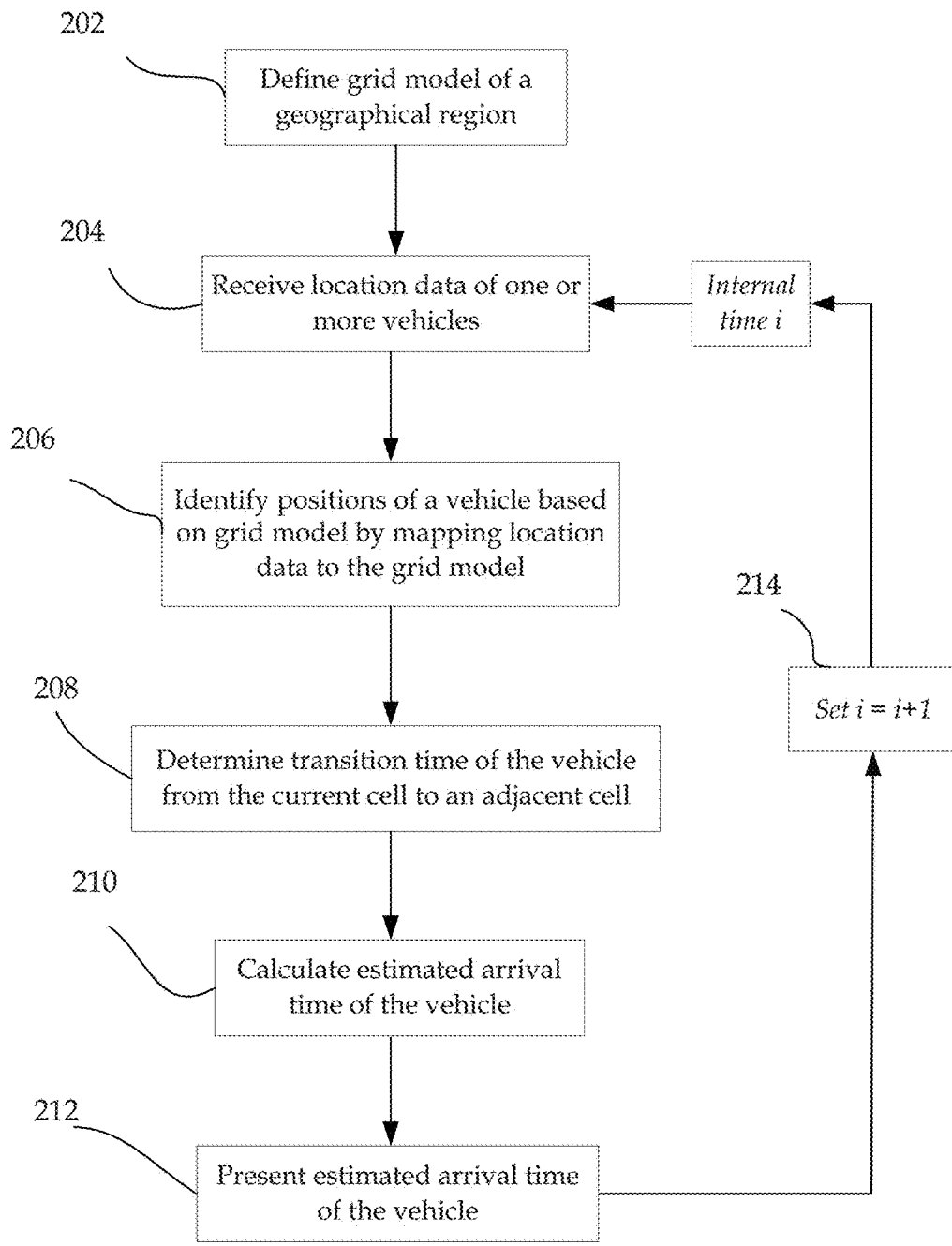
FIG. 2 shows an exemplary method of predicting arrival time of moving objects.

FIG. 2 shows an exemplary method 200 of predicting arrival time of moving objects. For purpose of illustration, the method 200 is described in the context of location data of vehicles collected by a GPS tracking system. The process 200 may be performed automatically or semi-automatically by the central computer system 106, as previously described with reference to FIG. 1. It should be noted that in the following discussion, reference will be made, using like numerals, to the features described in FIG. 1.

At 202, the grid modeling component 122 defines a grid model of a particular geographical region. In some implementation, the grid may be modeled based on latitude-longitude coordinate points. Other geocoordinate systems may also be useful. In one implementation, the grid modeling component 122 may set a boundary for the grid model of the geographical region so as to define the geographic coverage. In some cases, the grid of a geographical region may be bounded by global constraints such as −180<lon<180; −180<lat<180, while in other cases, the grid may be bounded by local constraints, e.g., lon1<lon<lon2; lat1<lat<lat2. Such constraints may be configured, for example, by a transportation system operator depending on the operational extent of the transportation service. Other configurations may also be useful. In other cases, the grid modeling component 122 may provide default constraints. The system operator may override the default constraints if desired.

Figure 3:
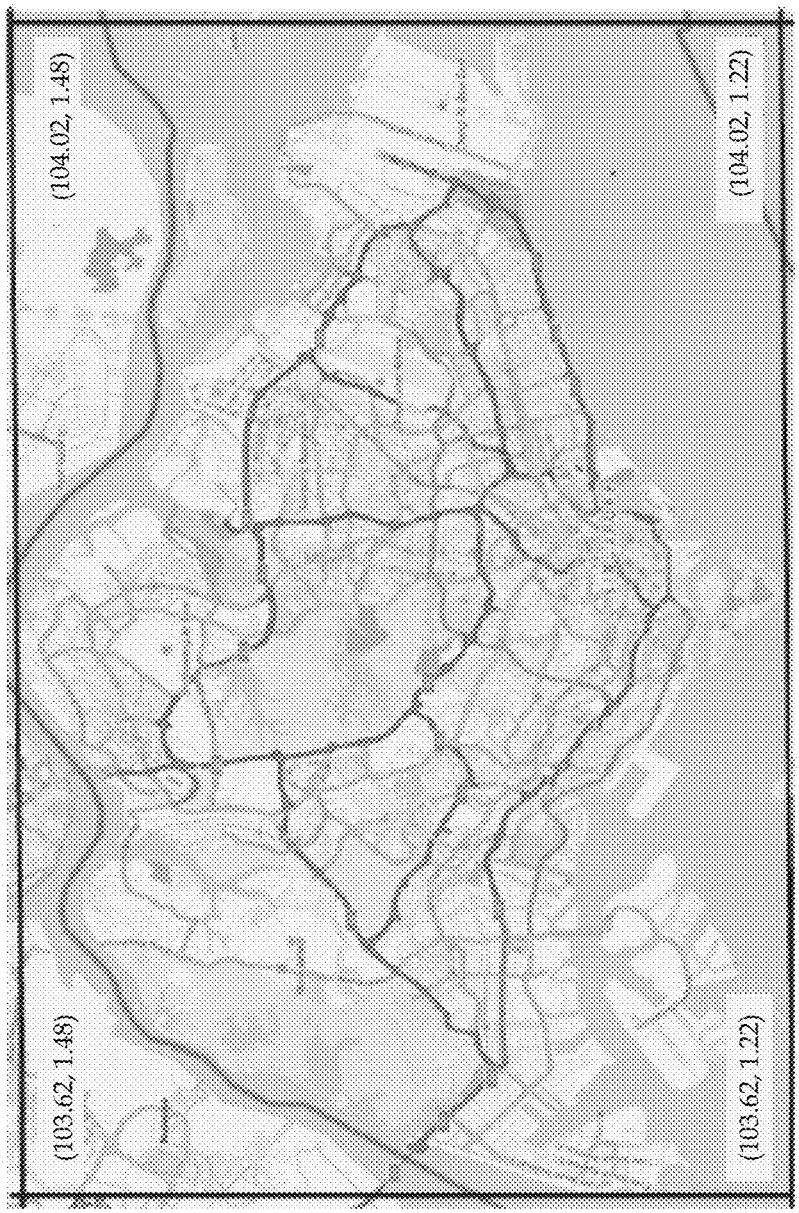
FIG. 3 shows an exemplary map that illustrates an boundary defined for a modeled grid of a specific geographical region.

FIG. 3 shows an exemplary map 300 that illustrates a boundary defined for a modeled grid of a specific geographical region. In particular, the map 300 is that of the country Singapore and as shown, the grid is locally bounded according to the geographic territorial boundary of Singapore. The grid boundary, for example, may be defined with the following grid coordinates: 103.62<lon<104.02; 1.22<lat<1.48.

The grid modeling component 122 may further segment the grid into cells. For example, the grid modeling component 122 may split the grid into rows and columns of cells. The number of rows and columns may be selected based on the desired number of cells resulting from the split. For example, a larger number of cells will result in a finer granularity while lower number of cells will result in a coarser granularity. A finer granularity enables the arrival time predictive engine 126 to operate with a greater level of detail, resulting in greater frequency of updates and accuracy in predicting the estimated arrival time of vehicles. In some implementations, the cells of the grid may further be numbered. For example, the cells may be numbered in a sequential fashion. The cell number identifies the spatial location of the cell within the grid model.

Figure 4:
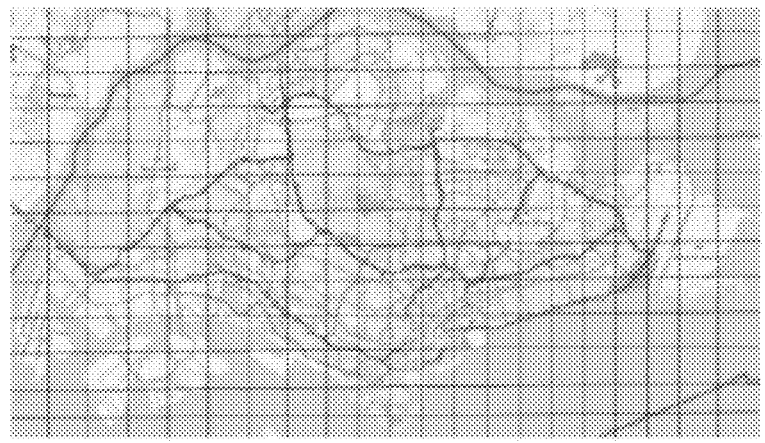
FIG. 4 illustrates an exemplary grid-views of a map based on different degree of segmentation of a grid.
Figure 4:
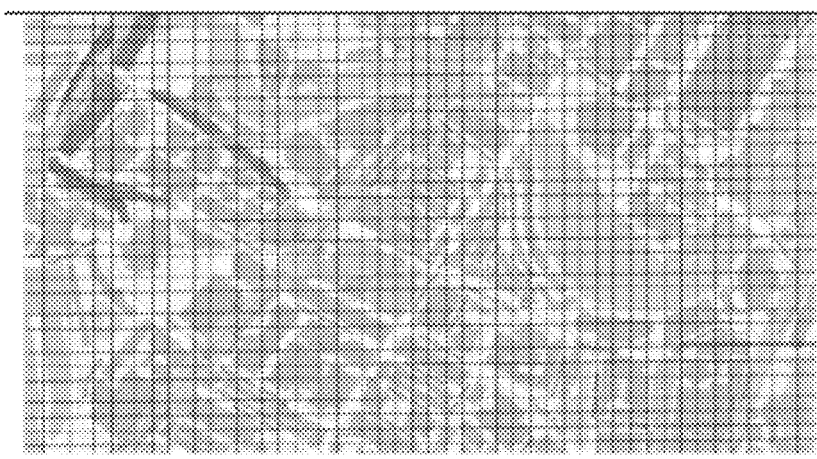
Figure 4:
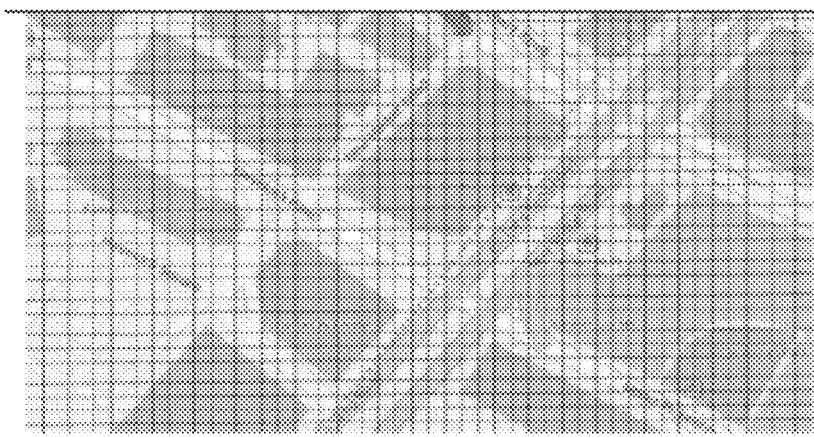

FIG. 4 illustrates exemplary grid-views 400*a-c* of the map 300 based on different degree of segmentation of the grid. As shown in the grid-view 400*a*, the grid of map 300 is segmented into cells by a set of rows and columns. Grid-views 400*b-c* show an enlarged part of the map with a greater number of cells as the grid modeling component 122 is configured to split the grid with an even greater set of rows and columns. As depicted in the grid-view 400*c*, the grid modeling component 122 splits the grid with an even larger number of rows and columns, resulting the coverage per cell to be limited to a smaller area. Such coverage provides higher precision or detail that is almost up to the road segment level.

Referring back to FIG. 2, at 204, the grid modeling component 122 may receive location data of one or more vehicles at an internal time i. For example, the location data may be the current location data of vehicles. The location data may be provided by the signal collection system 160. The signal collection system 160, for instance, may collect GPS location data of vehicles from one or more GPS devices 165 installed on the vehicles. For example, the location data may be a data stream of location data. The data stream may include location data of multiple vehicles. Receiving data stream of a single vehicle may also be useful. In the case where the location data stream includes multiple vehicles, the data stream of the vehicles may be analyzed simultaneously. For example, the grid modeling component 122 may process the location data of multiple vehicles at the same time. For example, multi-processing techniques may be employed to process location data of multiple vehicles.

The data stream, for example, may be on-line location data. For example, the location data may be a data stream which is continuously fed to the grid modeling component 122 for processing. In such case, predicting the estimated arrival time of the vehicles effectively provides estimated arrival time of the vehicles in real time as the location data is provided to the system. Other configurations of the location data may also be useful. For example, data stream may also include offline location data, such as historical location data provided by database 128.

As the grid modeling component 122 receives the stream of location data of the vehicles, at 206, the grid modeling component 122 may identify positions of a vehicle based on the modeled grid by mapping the location data of the vehicle to the grid model. For example, the grid modeling component 122 may map the GPS location data of the vehicle to the grid cells based on the latitude-longitude coordinates of the location data. The grid modeling component 122 may further determine cell numbers based on the latitude-longitude coordinates so as to identify the positions of the vehicle within the modeled grid.

For example, the grid modeling component 122 may calculate a grid position of the vehicles as follows:

$$\text{gridX} = \text{floor}[\{(\text{lat}-\text{lat1})*\text{rows}\}/(\text{lat2}-\text{lat1})]$$

$$\text{gridY} = \text{floor}[\{(\text{lon}-\text{lon1})*\text{columns}\}/(\text{lon2}-\text{lon1})]$$

wherein gridX and gridY denotes the position of the vehicle in the grid model, lat and lon are the coordinate points acquired from the received vehicle location data, lat1, lat2, lon1 and lon2 are the defined grid model boundaries, rows and column denotes the number of rows and columns used in the segmentation of the grid model.

The cell number of the cell in which the bus is located may be identified as follows:

$$\text{cell\_number} = ((\text{columns}*(\text{gridX}-1))+\text{gridY})$$

The identified cell number may be routed to the arrival time predictive engine 126 for further analysis.

Figure 5:
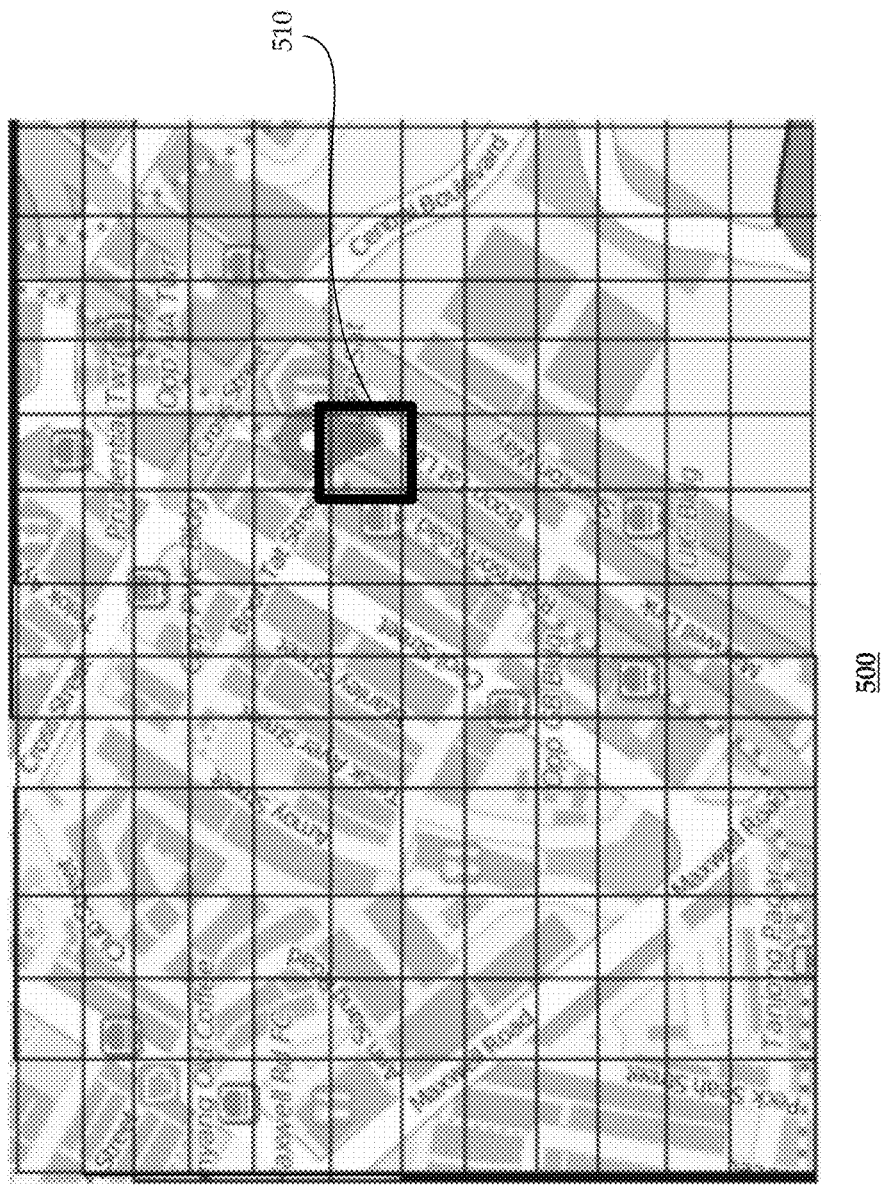
FIG. 5 shows an exemplary map that illustrates the position of a moving object in a segmented grid.

FIG. 5 shows a map 500 that illustrates the position of a moving object in the segmented grid. The map 500 includes a marker 510 that indicates the position of the bus. The map 500, as shown, has a cell segmentation that is detailed enough such that the marker 510 may be identified up to the road segment level. In some implementations, the map 500 may be presented on one or more user devices 151 in response to a request from one or more commuters.

Referring back to FIG. 2, at 208, the arrival time predictive engine 126 may determine the duration of the cell transition of the vehicle, for example, from a current cell to an adjacent cell. In other words, the time spent by a vehicle within a cell before moving to an adjacent cell may be determined. The arrival time predictive engine 126 may use time windows to determine the duration for traversing from one cell to another. For example, the arrival time predictive engine 126 may determine the duration of transition from the current cell to an adjacent cell at a time window starting from the internal time i.

Figure 6A:
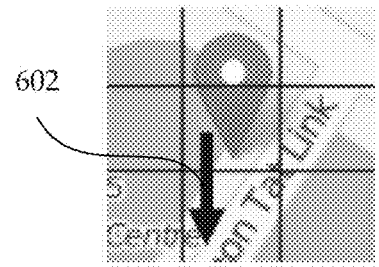
FIGS. 6a-b illustrate exemplary transition of a vehicle between cells.
Figure 6B:
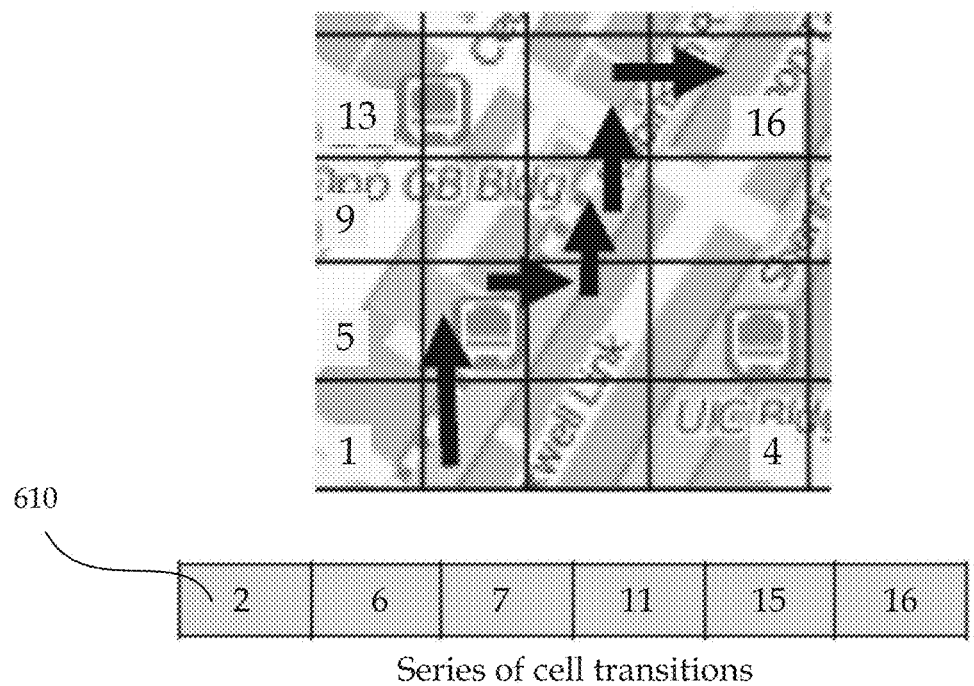

FIGS. 6a-b illustrate exemplary transition of a vehicle between cells. As depicted in FIG. 6a, the transition of the vehicle from a cell 'm' to a cell 'n' as depicted by the arrow 602, in one time window, may be denoted as '$C_{m \to n}$', while the time taken for the transition may be denoted as '$t_{m \to n}$'. In some implementations, the arrival time predictive engine 126 may also determine the average time of all vehicles transitioning from the cell 'm→n' in that same time window and denote this value as '$T_{m \to n}$'.

At 210, the arrival time predictive engine 126 may calculate the estimated arrival time of the vehicle based on the transition time of the vehicle between the grid cells. In some implementations, the arrival time predictive engine 126 may estimate the arrival time ($T_{est}$) of the vehicle, for example, based on its transition time $t_{m \to n}$ from its current cell m to a subsequent adjacent cell n and the average transition time $T_{m \to n}$ of all vehicles transitioning between the cells $C_{m \to n}$ in the same time window. The arrival time predictive engine 126 may estimate the arrival time ($T_{est}$) of a vehicle as it transitions between cells along its route using the following algorithm:

$$C_{m \to n}: T_{est} \leftarrow T_{est} + (T_{m \to n} - t_{m \to n})$$

In some implementations, the initial value of the estimate for $T_{est}$ may be based on, for example, the scheduled arrival time ($T_{route}$) of the vehicle. The scheduled arrival time, $T_{route}$ may be, for example, retrieved from the data sources 118 or from transportation data stored in database 128. For instance, the arrival time predictive engine 126 may invoke the data mining engine 124 to acquire the scheduled arrival time of the vehicle from one or more data sources 118. In other implementations, if the schedule of the vehicle is not available for retrieval, the arrival time predictive engine 126 may determine $T_{route}$ by calculating the average time for traveling along a specific route over a window of time, for example, by aggregating the time spent by all vehicles following a similar route or that made a similar cell transition.

The arrival time may be calculated and output every time the vehicle makes a cell transition. In other words, the arrival time predictive engine 126 continuously predicts the estimated arrival time for the vehicles. In some cases, if the grid splitting is good (i.e. highly granular or contains a large number of cells), the transition is quick and the prediction algorithm returns the arrival time in a dynamic fashion.

At 212, the arrival time predictive engine 126 may present the estimated vehicle arrival time to one or more user devices 151. At 214, the internal time i of the central computer system 106 is set to the next time i+1 and the process 200 repeats to provide the estimated arrival time of the vehicle as it transitions to another cell.

FIG. 6b illustrates an exemplary map 600 of transitions of a vehicle between cells as the vehicle moves along its route. The cells, for example, may be numbered in a sequential fashion. For example, the cells as illustrated in map 600 may be numbered as 1-16 starting from the lower left of the map 600. In some implementations, the grid modeling module 122 may determine a series 610 of vehicle cell transitions. The cell transitions may be determined, for example, by modeling the vehicle route. The grid modeling module 122 may acquire the route information of the vehicle by invoking the data mining engine 124 to acquire the route information of the vehicle from one or more data sources 118. For example, the data mining engine 124 may search a transport provider's database to acquire route information of vehicles. The grid modeling component 122 may also store the modeled route information in database 128 for retrieval by the arrival time predictive engine 126. Other methods of acquiring vehicle route information may also be useful.

With reference to the vehicle cell transitions in FIG. 6b, the arrival time predictive engine 126 may continuously estimate the arrival time ($T_{est}$) of the vehicle as it transitions between cells along its route using the algorithm as described earlier. For example, the arrival time ($T_{est}$) of the vehicle may be estimated as it transitions between cells as follows:

$T_{est} \leftarrow T_{route}$ (scheduled arrival time)

$C_{2 \to 6}: T_{est} \leftarrow T_{route} + (T_{2 \to 6} - t_{2 \to 6})$ $C_{6 \to 7}: T_{est} \leftarrow T_{est} + (T_{6 \to 7} - t_{6 \to 7})$ $C_{7 \to 11}: T_{est} - T_{est} + (T_{7 \to 11} - t_{7 \to 11})$ $C_{11 \to 15}: T_{est} \leftarrow T_{est} + (T_{11 \to 15} - t_{11 \to 15})$ $C_{15 \to 16}: T_{est} \leftarrow T_{est} + (T_{15 \to 16} - t_{15 \to 16})$ Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method of predicting arrival time, comprising:

providing, by a processor, a grid model comprising a grid of a geographical region, wherein a boundary of the grid is defined using latitude and longitude coordinate points, the grid is segmented into cells based on a set of rows and columns;

receiving, from a signal collection system, location data of a moving object;

identifying, by the processor and based on the grid model, positions of the moving object on the grid by mapping the location data to the cells of the grid, wherein identifying the positions of the moving object comprises calculating the position of the moving object on the grid using a floor function which is a mathematical function which utilizes the coordinate points of the boundaries defined for the grid model, the set of rows and columns used in the segmentation and the location data of the moving object;

determining, by the processor, a cell transition time of the moving object from a current cell to another cell of the grid;

predicting, by the processor, an arrival time of the moving object based on the cell transition time of the moving object; and presenting the arrival time of the moving object to one or more user devices.

2. The method of claim 1 wherein determining the cell transition time of the moving object comprises determining the transition time within a time window.

3. The method of claim 2 further comprising determining an average cell transition time of all moving objects from the current cell to the other cell within the time window.

4. The method of claim 3 wherein predicting the arrival time of the moving object further comprises calculating the arrival time based on the average cell transition time of all moving objects from the current cell to the other cell.

5. The method of claim 4 wherein the cells are numbered sequentially and further comprising calculating the arrival time of the moving object based on the following algorithm:

$$C_{m \to n} : T_{est} \leftarrow T_{est} + (T_{m \to n} - t_{m \to n})$$

wherein $C_{m \to n}$ is the transition of the moving object from the current cell denoted as m, to the other cell denoted as n;

$T_{est}$ is the estimated arrival time of the moving object;

$t_{m \to n}$ is the cell transition time of the moving object from the current cell m to the other cell n; and $T_{m \to n}$ is the average cell transition time of all moving objects from the current cell m to the other cell n.

6. The method of claim 5 wherein an initial value of $T_{est}$ may be retrieved from a scheduled arrival time of the moving object.

7. The method of claim 1 wherein the signal collection system is a global positioning system.

8. The method of claim 7 wherein the location data comprises latitude-longitude coordinates points.

9. The method of claim 1 wherein receiving the location data comprises receiving location data stream of the moving object.

10. The method of claim 1 further comprising receiving location data of a plurality of moving objects, the location data comprises object identifier, location information and time stamp information.

11. The method of claim 1 wherein identifying positions of the moving object comprises calculating the position of the moving object on the grid using gridX=floor[{(lat-lat1)*rows}/(lat2-lat1)] and gridY=floor[{(lon-lon1)*columns}/(lon2-lon1)], wherein floor is the mathematical function, gridX and gridY denote the position of the moving object in the grid model, lat and lon are coordinate points in the received location data of the moving object, lat1, lat2, lon1 and lon2 are boundaries defined for the grid model, rows and columns denote number of rows and columns.

12. The method of claim 11 wherein the set of rows and columns are user defined.

13. The method of claim 11 wherein identifying a position of the moving object based on the grid model comprises determining a cell at which the moving object is located, wherein determining the cell comprises calculating a sequenced number which is assigned to the cell, the calculation is performed using cell_number=((columns*(gridX−1))+gridY).

14. The method of claim 13 wherein the segmented cells are numbered in sequence.

15. The method of claim 14 further comprising determining a series of cell transitions of the moving object.

16. The method of claim 15 further comprising continuously calculating the arrival time of the vehicle as it transitions between cells.

17. A system comprising:
a non-transitory memory device for storing computer-readable program code; and
a processor in communication with the memory device, the processor being operative with the computer-readable program code to
provide a grid model comprising a grid of a geographical region, the grid is segmented into cells based on a set of rows and columns;
receive location data of a moving object;
identify, based on the grid model, positions of the moving object on the grid by mapping the location data to the cells of the grid, wherein identifying positions of the moving object comprises calculating the position of the moving object on the grid using gridX=floor[{(lat-lat1)*rows}/(lat2-lat1)] and gridY=floor[{*(lon-lon1)*columns}/(lon2-lon1)], wherein floor is a mathematical function, gridX and gridY denotes the position of the moving object in the grid model, lat and lon are coordinate points in the received location data of the moving object, lat1, lat2, lon1 and lon2 are boundaries defined for the grid model, rows and columns denote number of rows and columns;
determine a cell transition time of the moving object from a current cell to another cell of the grid;
predict an estimated arrival time of the moving object based on the cell transition time of the moving object; and
present the estimated arrival time of the moving object to one or more user devices.

18. The system of claim 17 further comprising determining an average cell transition time of all moving objects from the current cell to the other cell within a time window and predicting the estimated arrival time of the moving object based on the average cell transition time of all moving objects.

19. The system of claim 18 wherein the location data comprises latitude-longitude coordinates points received in real time from a global positioning system.

20. A non-transitory computer-readable medium having stored thereon program code, the program code executable by a computer to perform steps comprising:
providing, by a processor, a grid model comprising a grid of a geographical region, the grid is segmented into cells based on a set of rows and columns;
receiving, from a positioning device, location data of a moving object;
identifying, by the processor and based on the grid model, positions of the moving object on the grid by mapping the location data to the cells of the grid, wherein identifying positions of the moving object comprises calculating the position of the moving object on the grid using gridX=floor[{(lat-lat1)*rows}/(lat2-lat1)] and gridY=floor[{(lon-lon1)*columns}/(lon2-lon1)], wherein floor is a mathematical function, gridX and gridY denotes the position of the moving object in the grid model, lat and lon are coordinate points in the received location data of the moving object, lat1, lat2, lon1 and lon2 are boundaries defined for the grid model, rows and columns denote number of rows and columns;
determining, by the processor, a cell transition time of the moving object from a current cell to another cell of the grid;
estimating, by the processor, an arrival time of the moving object based on the cell transition time of the moving object; and
presenting the estimated arrival time of the moving object to one or more user devices.

* * * * *